P. MILLSPAUGH.
Improvement in Testing Burning Fluid.
No. 127,259.                        Patented May 28, 1872.
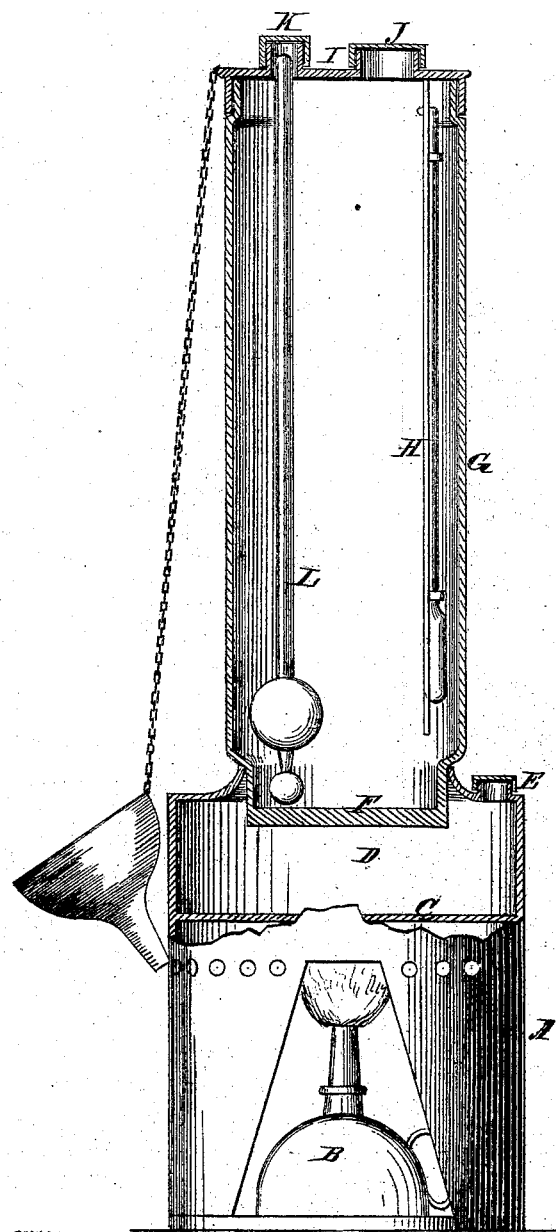
Witnesses:
John Becker
Francis McArdle
Inventor:
P. Millspaugh
per ——
Attorneys.

UNITED STATES PATENT OFFICE.

PETHUEL MILLSPAUGH, OF KENT, CONNECTICUT, ASSIGNOR TO FLORA T. MILLSPAUGH, OF SAME PLACE.

IMPROVEMENT IN TESTING BURNING-FLUIDS.

Specification forming part of Letters Patent No. 127,259, dated May 28, 1872.

*To all whom it may concern:*

Be it known that I, PETHUEL MILLSPAUGH, of Kent, in the county of Litchfield and State of Connecticut, have invented a new and useful Improvement in Instrument for Testing Burning-Fluid and ascertaining the specific gravity of fluids; and I do hereby declare that the following is a full, clear, and exact description thereof, which will enable others skilled in the art to make and use the same, reference being had to the accompanying drawing forming part of this specification.

This invention relates to a new and useful improvement in instruments for testing kerosene-oils and other illuminating fluids, and for ascertaining the specific gravity of oils, spirits, and all other fluids; and it consists in a combined instrument, so constructed that the thermometer for determining the temperature, and the hydrometric scale for determining the specific gravity, are surrounded by a glass cylinder or transparent medium, the said glass cylinder or vessel being filled with the liquid to be tested, so that the thermometer is entirely submerged therein in testing burning-fluids, and in ascertaining the specific gravity, the hydrometric scale is buoyed up with its end projecting from the top of the tube, all as hereinafter more fully set forth and described.

The accompanying drawing is a front view of an instrument constructed according to my invention, the drawing being partly in section.

A is a lamp-chamber or casing, open on one side for inserting the lamp B. C is the top of the lamp-chamber. D is a chamber above the top of the lamp-chamber, which, in testing burning-fluids, may contain water, air, or other fluid to screen the fluid to be tested from a too intense heat. E is an aperture through the top of the chamber D, which may be provided with a stopper or cap, as seen. In the top of the chamber D, secured in a suitable cup, E, I place the glass cylinder G, closed tightly at its bottom end, and of sufficient length to receive and inclose a thermometer entire. H is the thermometer. 1 is the cap or top piece of the glass cylinder, made of metal, with its flange inclosing the top of the cylinder, as seen in the drawing. In this cap are two orifices, provided with suitable covers or stoppers, one, marked J, being the orifice for testing the vapor, and the other, marked K, for allowing the tube of the hydrometric scale to project when testing a fluid to ascertain its specific gravity. The glass cylinder G I fill with the fluid to be tested up to the bottom of the flange of the cap piece I, so that the thermometer (bulb and tube) is entirely submerged in the liquid.

In this example of my invention I employ a Fahrenheit thermometer, the standard temperature, as fixed by act of Congress, for burning-fluids being 110° by that thermometer; but I do not confine myself to that particular instrument as a heat-indicator; but by my system the thermometer or heat-indicator is to be entirely surrounded by the fluid to be tested, so that the mercury or other fluid in the thermometer shall not be influenced in any degree by the surrounding atmosphere, but be a true index of the temperature of the fluid being tested. By thus immersing the thermometer no error is possible; the result is invariably the same in all atmospheres; whereas a test made with the bulb only of the thermometer immersed and the tube exposed to the atmosphere, is deceptive and unsatisfactory.

The fluid to be tested is subjected to sufficient heat from the lamp B or from any other source to raise the temperature, should such heat be necessary, sufficient to evolve vapor from the liquid, which vapor will escape from the orifice J, the cover or stopper of which has been removed. A lighted match or flaming taper is held or waved over the orifice, and when ignitible vapor is evolved the temperature of the liquid is correctly indicated by the thermometer. As a precaution in making the test the cover from the orifice K may be removed, which gives any accumulated vapor a chance to escape.

Although the temperature of a liquid has no necessary relation to its specific gravity, hydrometers are so imperfect in their construction and so inconvenient to use that I combine it with the test-tube for the purpose of furnishing a cheap and reliable instrument to the public. L is the hydrometric scale, which, being immersed in any liquid placed in the cylinder G, the specific gravity of which it may be desired to ascertain, it will be seen that the surface of the liquid can be plainly seen through the cylinder, and that the accuracy of the test cannot be doubtful.

The advantages of this instrument are: That while for both purposes it is sure in its operation, it is so simple and cheap that it may be readily understood and used by all as a safeguard against imposition in purchasing illuminating and other fluids.

Having thus described my invention, I claim as new and desire to secure by Letters Patent—

1. In combination with an instrument for testing oils or burning-fluids, the transparent cylinder G or its equivalent for containing the fluid to be tested, and in which the thermometer is submerged, substantially as and for the purposes described.

2. In combination with the transparent cylinder G, the hydrometric scale L, substantially as and for the purposes described.

3. The combination and arrangement of the transparent cylinder G, thermometer H, and the hydrometric scale L, substantially as and for the purposes described.

PETHUEL MILLSPAUGH.

Witnesses:
JOHN S. CHAMBERLIN,
ABIJAH H. BEACH.